No. 760,950. PATENTED MAY 24, 1904.
R. BOLINGER.
AUTOMATIC GATE.
APPLICATION FILED FEB. 17, 1904.
NO MODEL. 3 SHEETS—SHEET 1.
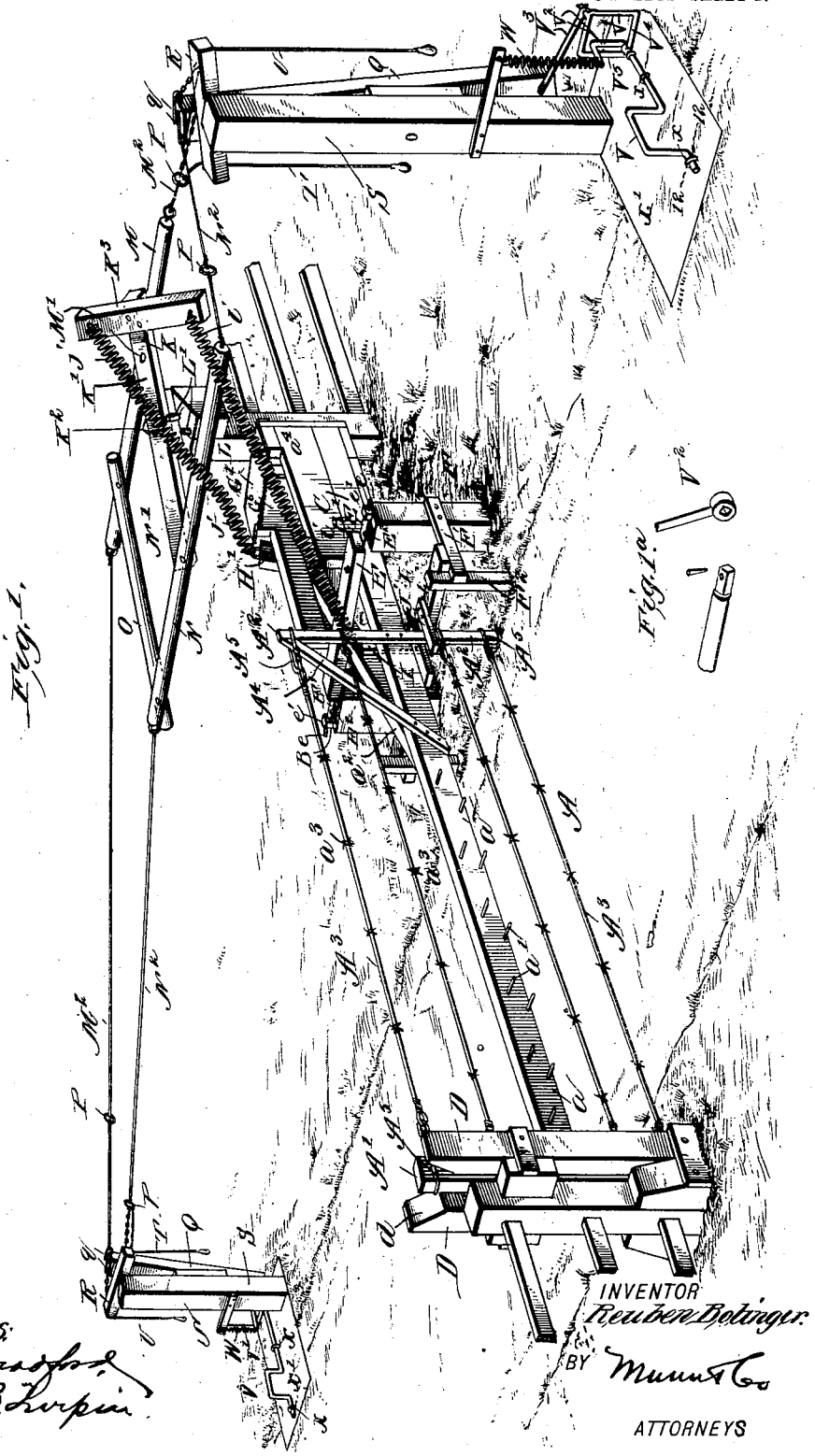

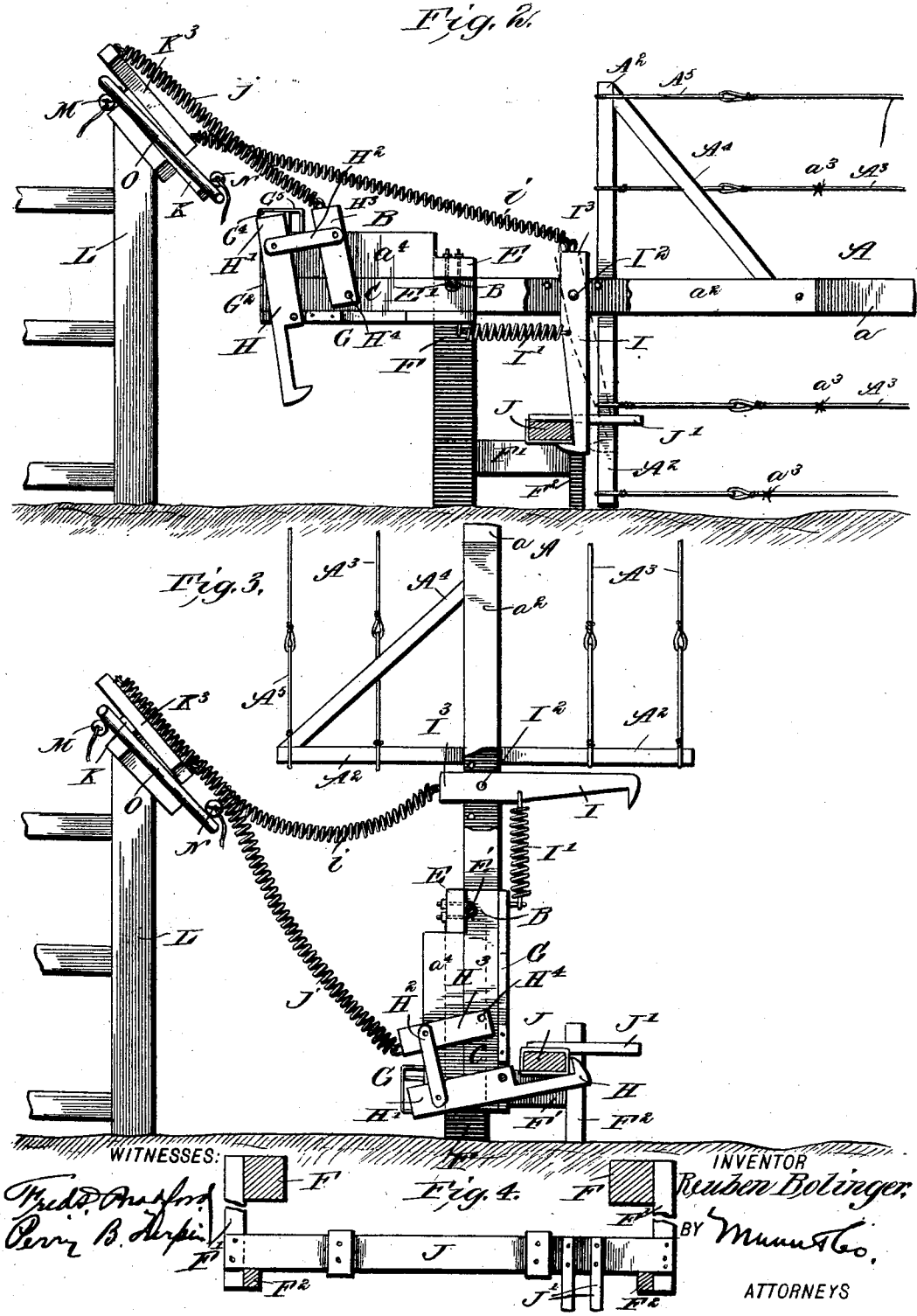

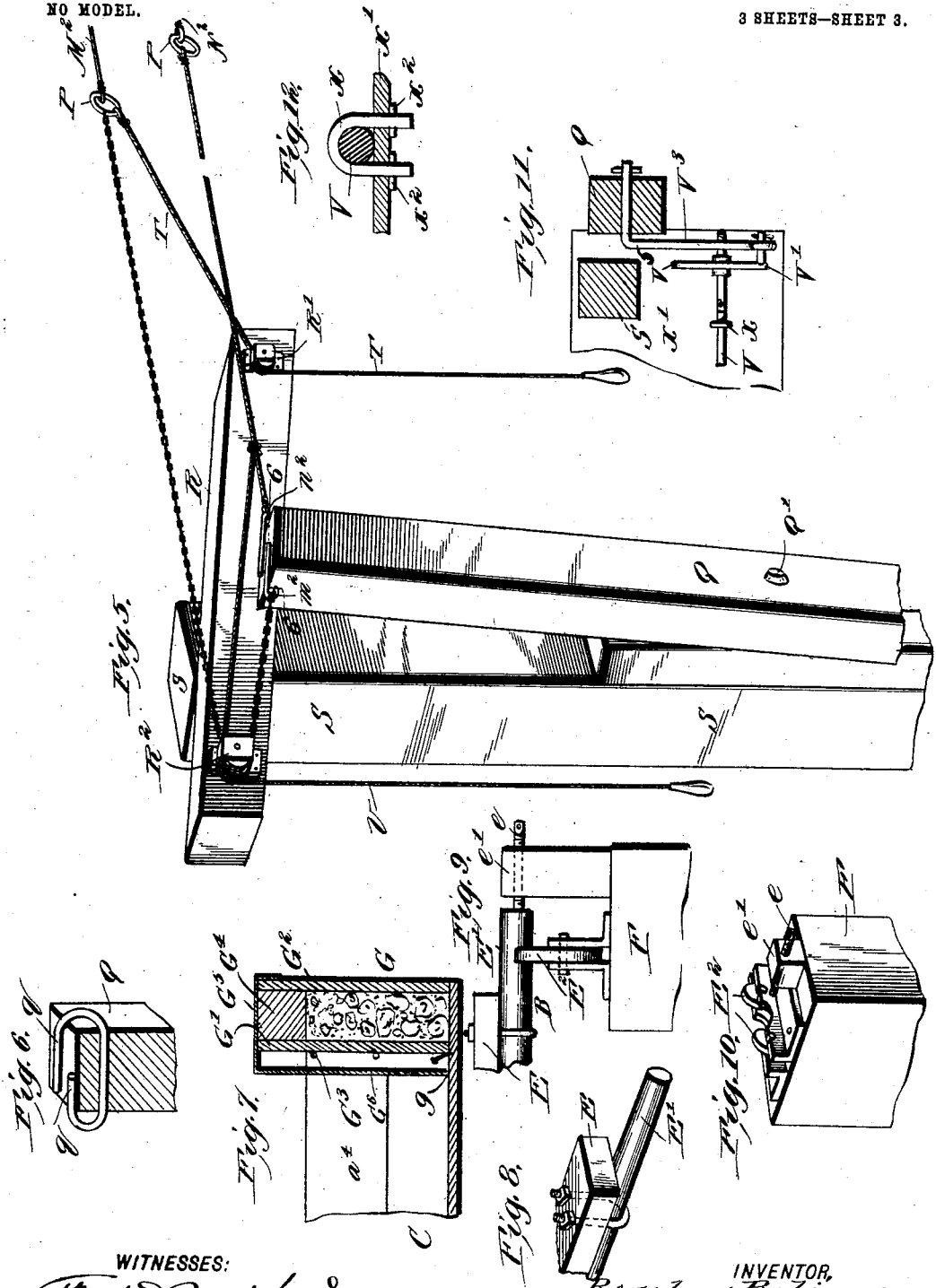

No. 760,950. Patented May 24, 1904.

UNITED STATES PATENT OFFICE.

REUBEN BOLINGER, OF SHERIDAN LAKE, COLORADO.

AUTOMATIC GATE.

SPECIFICATION forming part of Letters Patent No. 760,950, dated May 24, 1904.

Application filed February 17, 1904. Serial No. 194,072. (No model.)

*To all whom it may concern:*

Be it known that I, REUBEN BOLINGER, a citizen of the United States, residing at Sheridan Lake, in the county of Kiowa and State of Colorado, have made certain new and useful Improvements in Automatic Gates, of which the following is a specification.

My invention is an improvement in automatic gates, and especially in gates which tilt vertically, being movable thereby into and out of closed position; and the invention has for objects, among others, to provide a gate in which the operating means will act gradually on the gate in both opening and closing the same, thus relieving the gate proper of jars and shocks incident to the sudden or quick movement thereof; to provide springs for transmitting the movement of the operating devices to the gate, so that the movement of the gate will be gradual and free of shocks and the pull of the operating devices will not be exerted directly on the gate but on the springs and through the latter on the gate; to provide means so that whether the operating devices are pulled quickly or slowly the gate will be moved at substantially the same speed, so the gate cannot be broken by any sudden pull on the operating devices, and to provide intermediate the trip and the gate yielding or spring devices, so the gate will not be operated as quickly as the trip, but will be opened and closed by the springs and will have ample time for both movements.

The invention has for further objects other improvements; and it consists in certain novel constructions and combinations of parts, as will be hereinafter described and claimed.

In the drawings, Figure 1 is a perspective view of my gate as in use. Fig. 1ª is a detail view of the shaft-crank. Fig. 2 is a detail sectional view of the pivoted portion of the gate, the gate being in closed position. Fig. 3 is a view similar to Fig. 2, the gate being opened. Fig. 4 is a detail top plan view of the bar for engagement by the latches. Fig. 5 is a detail perspective view illustrating the pull-ropes and the rocking lever. Fig. 6 is a detail section on about line 6 6 of Fig. 5. Fig. 7 is a detail sectional view of the weight-box of the gate proper. Fig. 8 is a detail perspective view showing the axle by which the gate is pivoted. Fig. 9 is a detail elevation of the axle in its bearings. Fig. 10 is a detail perspective view showing the wooden bearings for the rollers supporting the axle. Fig. 11 is a sectional plan view showing the trip and the connection of same with the rocking arm which is operated by the trip, and Fig. 12 is a detail section on about line 12 12 of Fig. 1.

As will be understood from the drawings and from the detailed description which follows, my improved gate possesses advantages in many respects. Thus I provide three ways of opening and closing the gate. In the first place it can be opened and closed with buggies and wagons without stopping by means of the tripping devices. It can be opened from the back of a horse by pulling on ropes provided for such purpose. It can be opened and closed with a pitchfork run into rings on the operating-wires from a load of hay or other high load on a wagon. At the same time the gate possesses great simplicity and can be built by any one who can build an ordinary board fence. The tripping-cranks may be omitted, if desired, without departing from any of the broad principles of the invention. With all its advantages the gate will cost no more than an ordinary board gate and can be opened and closed so easily that a child can operate a gate fourteen feet wide. As the gate tilts vertically in operation, snow will not interfere with its movements, as it does with a gate that swings sidewise, and as the gate will be made largely of wire snow will not drift against it, as it will against a gate having broad wooden slats. As in use I build the gate proper partially of barbed wire and with barbs on the main bar, stock will not injure or break the gate. As the gate will be made rigid, it will be much stronger, more durable, and less likely to get out of repair than a loose folding gate. As the gate is balanced and hung on rollers, it will be easy to open and close, as it will turn on its pivot or axle like a wheel. Again, the gate will be opened and closed by the springs, so that when operated by hand it will not be possible to jam, injure, or otherwise break the gate by any sudden operation.

I also make the gate so it will balance in the wind and arrange the connecting parts overhead out of the mud and snow, so they will not be liable to get out of repair.

In operation the gate can be opened or closed by hand and can be operated either with or without the tripping-cranks, and a novice can open and close the gate without instruction.

It will also be understood that as the gate tilts upwardly to a high position it can be seen at a distance whether the gate is opened or closed.

The gate can be built at as low or lower cost than other automatic gates, would be more durable than an ordinary swinging gate, and can be readily adjusted and removed by the means hereinafter described.

The gate proper, A, is pivoted at B, preferably by means of the axle construction, which will presently be described in detail. For convenience of reference I term the swinging end of the gate A' the "front" and the opposite end of the gate the "rear" end, and the pivot B, it will be noticed, is located at the rear end $A^2$ of the gate, and the gate is provided with an extension C in rear of its pivot, which extension carries the weight-box, which counterbalances the body of the gate in the use of the invention, as will be presently described. At its front or swinging end A' the gate stands when in closed position between two spaced-apart uprights D, which are set sufficiently apart to receive the front end of the gate between them and are preferably beveled on their inner faces at their upper ends at $d$ to guide the swinging end of the gate between such uprights D in the use of the invention. The gate has its body formed with the main bar $a$, to which are rigidly secured the slats A' and $A^2$ at the front and rear end of the gate, such slats A' and $A^2$ projecting above and below the main bar $a$ and receiving the wire stringers $A^3$, which latter may preferably be barbed, as shown. I also provide the main bar $a$ with barbs $a'$, the barbs $a^3$ on the stringers $A^3$ and the barbs $a'$ on the bar $a$ tending to prevent cattle and other stock from injuring the gate. The slat $A^2$ may be braced by a strut-bar $A^4$, and by preference the stringers $A^3$ are connected at their ends with the slats A' and $A^2$ by short sections of plain wire $A^5$, as shown in Fig. 1.

In pivoting the gate I prefer to employ an axle E, which is secured to the main bar $a$ and to a diagonal brace $a^2$, which is held rigidly to the main bar $a$ at its front end and aids said main bar in supporting the weight-box, as will be presently described. This axle E extends transversely of the main bar and is provided at its ends with the spindles E', which journal on the roller-bearings $E^2$ on posts F, said roller-bearings $E^2$ being similar to those commonly employed on grindstones. Screws $e$ turn through bearings $e'$ on the posts F and by engaging with the ends of the spindles E' can be operated to properly adjust the pivotal bearing of the gate, as may be desired. The weight-box G forms a part of the rear extension of the gate proper, and this box is of a special construction, being provided, as best shown in Fig. 7, with an adjustable side or partition G', which can be set toward or from the opposite side $G^2$ and secured in any desired adjustment by the nails or spikes $G^3$, so the capacity of the box may be varied and the box be adapted to receive more or less weight, as may be desired. For weighting the box stones, earth, or other suitable material may be employed. The box G has a top $G^4$, over which extends the sheet-iron cover $G^5$, which is brought down at $G^6$ in front of the movable partition G' to protect the same. In operation the plate $G^6$ may be lifted at $g$ to permit access to the nails $G^3$, so that the latter and the partition G' may be removed whenever desired. By this means the contents of the box will be protected at all times for any desired purpose.

The portion of the gate proper in rear of its pivot is provided with boards $a^4$ to balance the wind-surface presented by the bar $a$ on the opposite side of the pivot, so that the gate can be easily operated even when a strong wind is blowing.

In operation the gate will be opened to the position shown in Fig. 3 and closed to the position shown in Fig. 2, and in order to hold the gate open I provide a latch H, and for holding the gate closed I provide a latch I. These latches, as shown, are arranged on opposite sides of the pivot E of the gate and engage with an abutment J, the same abutment being preferably used for engagement by both latches and such abutment also forming a stop for the gate when the latter is open. Thus in the operation shown in Fig. 2 the latch I engages with the abutment J, while in the position shown in Fig. 3 the latch H engages with such abutment. This abutment J is preferably a bar extending horizontally below the gate adjacent to the posts F, and such bar J is provided with the forwardly-projecting blocks J', spaced apart and receiving between them the rear slat $A^2$ of the gate and supporting the latter when the gate is closed, as shown in Figs. 1 and 2. The posts D and the blocks J' prevent stock from injuring the gate by pressing against it when the gate is closed and also enables me to make the gate very light with sufficient strength. The latch I is preferably actuated into engagement with the abutment J by the spring I', while the latch H is preferably actuated by its gravity into engagement with such bar, as will be understood from Figs. 2 and 3. Now in the operation of the gate I prefer to connect the operating devices with the gate through the medium of the latches, so that when such devices are operated the latch will be first released and the gate be then opened or closed, according to the movement of the operating devices. Thus when the parts are in the position shown in Fig. 2 the operating devices will first release the latch I and will then by pulling on said latch adjust the gate from the closed position (shown in Fig. 2) to that shown in Fig. 3, while if the parts are in the position shown in Fig. 3 the operating devices will first release the latch H and will then draw the gate toward the position shown in Fig. 2. In the construction shown and as preferred the latch H is made heavier at its rear end H' and is connected at such end by a link $H^2$ with a lever $H^3$, pivoted at one end at $H^4$ and connected at its other end with the operating devices. The latch I is pivoted between its ends at $I^2$, has the spring I' connected with its lower arm, and the operating devices connected with the upper arm $I^3$, as will be understood from Figs. 2 and 3. From the foregoing it will be understood that the gate will be moved from open to closed position, and vice versa, by the movement of the operating devices, the latter being preferably of the construction which I will now describe.

The operating devices include a cross-shaped lever K, having a shank K', pivoted at $K^2$ on the inclined surface at the upper end of a suitable support L, and a cross-bar $K^3$, secured at its middle to the upper arm of the shank K' and connected at one end with the latch I and at its other end with the latch J, such connection being preferably effected by means of the springs $i$ and $j$, as shown in Figs. 1, 2, and 3. This spring connection between the operating devices and the gate is important for many reasons, which have been suggested heretofore, as by such connection I relieve the gate of all jars and shocks incident to a sudden manipulation of the operating devices. It will also be noticed from Fig. 1 that when the operating devices have been adjusted to position to close the gate the connections $i$ and $j$ will be on one side of the pivot $K^2$. By thus arranging for the springs to pass the center $K^2$ of movement of the lever I prevent the lever from coming back to the opposite position until it is positively pulled to such position by the means presently described or by other suitable means, as may be desired. On the support L, I mount stop-pins L' to limit the movements of the cross-shaped lever K in both directions.

In the operation of the described construction it will be noticed that if the parts are in the position shown in Fig. 1 and the lever K be rocked toward the left to its reverse position it will draw upon the connection $i$ and through the latter will release the latch I and then will pull the gate from the closed position (shown in Figs. 1 and 2) to the open position. (Shown in Fig. 3.) As the gate adjusts to the latter position the latch H will engage with the abutment J, the lever K will pass the center, and the parts will remain in the position shown in Fig. 3 until they are positively operated to the reverse position, as shown in Fig. 1. Manifestly the lever K may be operated in various ways. I prefer to operate it by devices connected with the arms of the shank K on opposite sides of the pivot $K^2$. Thus in the construction shown I employ what for convenience of reference I may term the "upper" rod M and the "lower" rod N, secured between their ends at M' and N' with the upper and lower arms of the shank K, the latter being inclined, as shown in Figs. 2 and 3, extending parallel to each other and on opposite sides of the cross-shaped lever, as shown. At one end the rods M and N are connected by a rod O, which extends parallel with the shank K and with said shank and the rods M and N constitutes a construction similar to a parallel-rule. This construction of rods M, N, and O is important, as it prevents the line connections for operating the lever K from becoming entangled where they connect to the said lever, such line connections being in the construction shown secured to the opposite ends of the rods M and N, as will now be described. Line connections $M^2 M^2 N^2 N^2$ connect with the opposite ends of the rods M and N and extend thence over suitable guides for operation, as may be desired. I provide for operating the line connections by hand, as well as by a tripping device over which the wheel of a vehicle may be driven, and also for operation by a pitchfork or other like implement from a load of hay or other high load driven along the road. For the latter purpose I provide the line connections with rings or open links P, in which one of the tines of a pitchfork may be engaged.

As shown, the line connections $M^2$ extend slightly above the line connections $N^2$, and such connections $M^2$ and $N^2$ connect with the upper end of a rocking lever Q, which is pivoted at Q' between its ends and operates at its upper end along a guide-bar R, which latter is supported on a post S and is provided at its inner end or end nearest the gate with a guide-pulley R' and at its opposite end or end farthest from the gate with a guide-pulley $R^2$. A hand-pull T, which may be a rope or other suitable construction, is guided by the pulley R' and connects with the line connection $M^2$, so the latter may be operated by hand by pulling on the pull-cord T. This line connection $M^2$ extends over the pulley $R^2$ and thence back and connects at $m^2$ with the upper end of the rocking lever Q, while the line connection $N^2$ extends directly to and connects at $n^2$ with the upper end of the rocking lever Q, as shown in Fig. 5. A pull-cord U passes over the pulley $R^2$ and thence forward and connects with the line connection $N^2$ in advance of the point $n^2$, so said line connection $N^2$ may be operated by hand whenever desired. The connection on the lines $M^2$ and $N^2$ with the upper end of the lever Q is for the purpose of permitting the operation of such line connections from the tripping-cranks V presently described. The pull-cords T and U are entirely independent of the lever Q. In other words, said parts are independent.

In securing the line connection $M^2$ and $N^2$ to the rocking lever Q, I prefer to employ the hooks $q$, bent from the ends of a wire passed through the lever Q, as best shown in Fig. 6, the hooks being comparatively weak, so that a pull hard enough to break or otherwise injure the gate will straighten the hooks instead of injuring the gate. It will be noticed that the pull-cords connect with the line connections independently of the hooks $q$, so that in case the latter should become broken or injured at any time the pull-cords can be manipulated for operating the gate by hand as may be desired.

The tripping-cranks V, which are so arranged relatively to the roadway that they may be driven over by the wheels of a vehicle, are provided with crank $V^2$ and angle-arm $V'$, the former being connected with a spring W, by which the tripping-crank will normally be held in the position shown in Fig. 1, and the angle-arm $V'$, having side bars $V^4$ $V^5$, is connected by a link $V^3$ with the lower end of the rocking lever Q, so the movement of the tripping crank from one position to the other will by the operation of the crank $V^2$ upon the arm $V'$ properly operate the rocking lever to open or close the gate, as may be desired. It will be understood that the crank $V^2$ (see Fig. $1^a$) is secured on the shaft of the crank V and operates on the bars $V^4$ $V^5$ of the angle-arm $V'$. In journaling the shaft of the tripping-crank I prefer to employ the staples X (shown in detail in Fig. 12) and having their arms passed through the base-board $X'$, on which the shaft operates, the lower ends of the arms of the staples X being secured by the pins $X^2$, as will be understood from Fig. 12 of the drawings.

The comparatively weak hooks $q$ can be easily replaced, as they will straighten before the other connections with the gate will break, which is an important feature of my invention, as it avoids injury to the gate from the operation of one trip if the other should be blocked by a stone or otherwise held from movement.

The gate can be readily operated, as before described, and can be easily removed by detaching the springs $i$ and $j$ from their latches and removing the screws $e$, which latter hold the spindles $E'$ in their bearings, as will be understood from Fig. 9, and these screws $e$ permit the convenient adjustment of the gate as may be desired.

In practice the gate is slightly overbalanced, so that in the closed position (shown in Fig. 2) as well as in the open position (shown in Fig. 3) the latches will not bind in connection with the abutment, but can be readily operated along the same, so that the drawing of the latches preliminary to opening or closing the gate will not be rendered difficult by the binding of such latches against the abutment.

As best shown in Fig. 1, the horizontal blocks $F'$ and the stakes $F^2$ for supporting the abutment J project in front of the posts F and form guards to prevent vehicles from being driven against the gate when the latter is open.

The bars R incline downwardly toward their ends next the gate to prevent the wires or connections from becoming entangled.

In practice the center of the weight of the gate proper is preferably above the pivot when the gate is closed to accomplish the overbalancing of the gate in both open and closed position, and thus free the latches from binding contact with the abutment, as before described.

As best shown in Fig. 5, I use sections of chain at the ends of the line connections $N^2$, passing the said chain-sections around the guide-pulleys $R^2$, this being important, as such chain-sections will not stretch or contract under the influence of the weather.

Having thus described my invention, what I claim as new, and desire to secure by Letters Patent, is—

1. The improved gate comprising the gate proper pivoted whereby it may tilt, the cross-shaped lever in rear of the gate proper having its shank pivoted between its ends, and its cross-bar secured to the upper arm of the shank, spring connections between the opposite ends of said cross-bar and the gate, said connections being secured to the gate one in front and the other in rear of its pivot, the cross-shaped lever being movable in both directions to a position where the springs will pass the pivotal center of the lever, upper and lower rods connected with the shank of the lever above and below its pivot, a rod connecting said upper and lower rods, and line connections connected with the upper and lower rods, substantially as set forth.

2. The combination of the tilting gate, the cross-shaped lever having a pivoted shank, and spring connections between the opposite sides of said cross-shaped lever and the tilting gate, the lever being movable in both directions to a position where the spring connections will be beyond the pivot of the shank substantially as set forth.

3. The combination of the tilting gate, the cross-shaped lever having its shank pivoted in rear of the gate, spring connections between the cross-bar of said lever and the gate, and line connections connected with the lever, substantially as set forth.

4. A tilting gate provided with latch devices adjacent to its pivot and rocking in a plane approximately parallel to that of the gate.

5. A tilting gate having latches on opposite sides of its pivot, one of the latches being arranged to hold the gate open and the other latch to hold the gate closed, said latches rocking in a plane approximately parallel to that of the gate.

6. The combination of the gate, a cross-shaped lever pivoted in rear of the gate, connections between the opposite ends of the cross-bar and the gate, said connections being connected with the gate on opposite sides of its pivot and the lever being movable in both directions to positions where the connections will be past the pivotal center of the lever.

7. The combination with the tilting gate of a lever arranged in rear of the gate and rocking laterally to opposite sides of the plane of the gate, and connections between said lever and the gate, the lever being movable to positions in which the connections will be past the pivot of the lever when the latter is at rest.

8. The combination with the gate of rocking levers on opposite sides of the gate and rocking toward and from the closed position of the gate, and upper and lower line connections connected with said rocking levers, intermediate devices between the line connections and the gate, and the tripping devices connected with the rocking levers.

9. A tilting gate, rocking latches on opposite sides of the pivot of the gate, devices for engagement by the latches to hold the gate open and closed, a lever-operating mechanism and connections between the latches and the operating mechanism by which to move the latches to release the same.

10. A gate having opposite latches, means for engagement with the latches to alternately hold the gate open and closed, a lever-operating mechanism, and spring connections between the latches and the operating mechanism.

11. A vertically-tilting gate having opposite latches rocking in a plane approximately parallel to that of the gate, devices for engagement with the latches to hold the gate opened and closed, a lever-operating mechanism, and connections between the latches and the operating mechanism to alternately move the latches into and out of operative position.

12. The combination with two posts, of a vertically-tilting gate carried by the posts, an abutment adjacent to the rear end of the gate, oppositely-movable latches on the gate to alternately engage the abutment to retain the gate open or closed, and means for alternately contacting the latches with the abutment.

13. The combination of posts, a vertically-tilting gate carried by the posts, an abutment, a movable latch on the gate for engaging with the abutment when the gate is in a vertical position or open, a latch movable on the gate for engaging with the abutment when the gate is in a horizontal position or closed, and means for releasing the latches from engagement with the abutment.

14. A vertically-tilting gate, a latch upon one side of the pivot of the gate, a latch upon the other side of the gate-pivot, a gate-operating mechanism, and longitudinal springing connections between the operating mechanism and latches.

15. A tilting gate, comprising a main bar, a weight-box at the rear end of the bar, and projecting to one side thereof, a diagonal brace connected with the bar and weight, and bracing such outer side of the weight-box, opposite spindles carrying the bar and brace, and standards having bearings for the spindles.

16. The combination of a tilting gate, a post in rear of the pivot of said gate, a cross-shaped lever pivoted at such post, parallel rods carried by said lever on opposite sides of its pivot, rods connecting the outer ends of said rods, the operating devices and connections between the cross-shaped lever and the gate, substantially as set forth.

17. A tilting gate having a weight-box provided with a laterally-movable closure or partition.

18. The combination of a tilting gate, a latch-abutment adjacent to the pivot of the gate, a pivoted latch engaging said abutment, a pivoted lever, carried by the gate, in rear of the pivot of the latter, a connection between the lever and the latch, a gate-operating mechanism, and a connection between the gate-operating mechanism and the lever.

19. A tilting gate, a pivoted latch connected therewith for engagement with an abutment whereby the gate may be held against movement, a lever on the gate, a connection between the latch and lever, an operating mechanism, and a spring connecting the same with the lever.

20. A tilting gate, a pivoted lever arranged in rear of connections between said lever and the gate, parallel rods carried by the lever on opposite sides of its pivot, and means connected with the ends of the rods for actuating the gate.

21. A tilting gate, a pivoted cross-shaped lever, having a cross-bar and springs interposed between and connecting the cross-bar of said lever and the gate to alternately exert tension thereon whereby to open and close the gate.

22. A tilting gate, a post in rear of the gate, a pivoted lever on the said post, springs connecting the gate and such lever, rocking levers on opposite sides of the gate, connections between the rocking levers and said first pivoted lever, the opposite shafts, having cranks and arms and links between each said arm and its respective rocking lever.

23. A pivoted tilting gate, latches carried by the gate for holding the same open and closed, a post in rear of the gate, a pivoted lever on the post, spring connections between the latches and the lever, and means for operating the pivoted lever.

24. A tilting gate, an operating mechanism, two separate sets of means for actuating the operating mechanism and a bendable connection between the two mechanisms for detachment therefrom under abnormal stress of tension.

25. The combination of the tilting gate, rocking levers on opposite sides of the gate, upper and lower line connections connected with said rocking levers, guides for the upper line connections, said guides being located on the opposite sides of the rocking levers from the gate, whereby the upper line connections will extend beyond the rocking levers, and will be returned thereto, and intermediate connections between the line connections of the gate.

26. The combination of the tilting gate, the lever in rear of the gate and movable in a plane at a right angle to that of the gate, tripping devices on opposite sides of the gate and connections between said tripping devices and the upper and lower arms of the lever, the connections with the opposite tripping devices and the lever being reversed substantially as set forth.

REUBEN BOLINGER.

Witnesses:
SOLON C. KEMON,
PERRY B. TURPIN.